March 20, 1962  L. L. PAULSON ET AL  3,025,949
LUNCH BOX
Filed Sept. 28, 1959
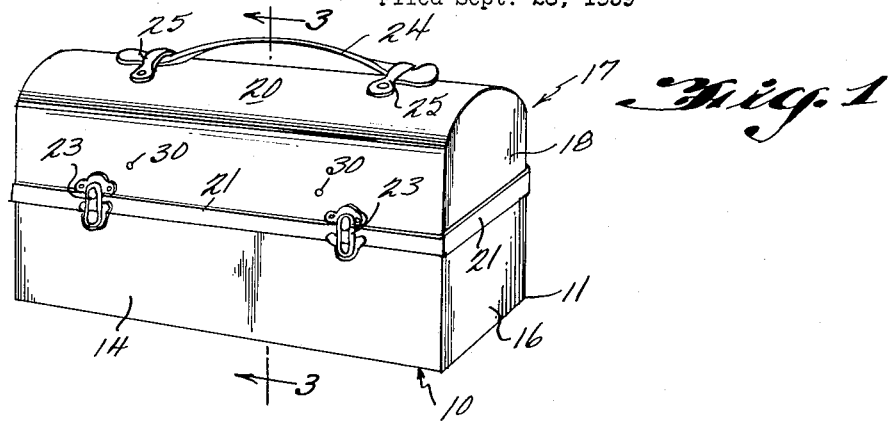
Fig. 1
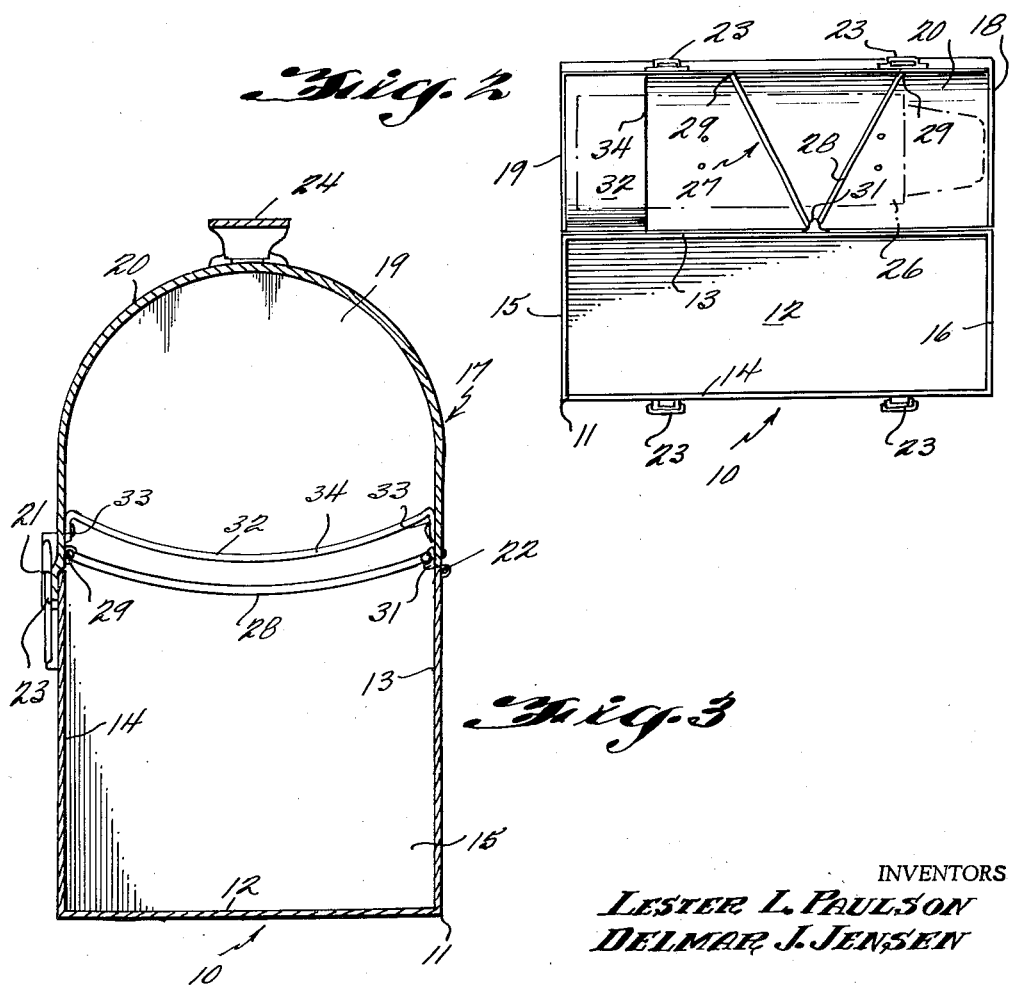
Fig. 2
Fig. 3
INVENTORS
*LESTER L. PAULSON*
*DELMAR J. JENSEN*
BY
*Kimmel & Crowell*
ATTORNEYS

United States Patent Office 3,025,949
Patented Mar. 20, 1962

3,025,949
LUNCH BOX
Lester L. Paulson and Delmar J. Jensen, Baker, Mont., assignors to Little Chief Products, Inc., Deadwood, S. Dak., a corporation of South Dakota
Filed Sept. 28, 1959, Ser. No. 842,960
1 Claim. (Cl. 206—4)

The present invention relates to a lunch box of the type for use with a vacuum bottle.

The primary object of the invention is to provide a relatively large lunch box having means therein for retaining a vacuum bottle against end-wise movement, while releasably supporting the vacuum bottle in the cover.

Another object of the invention is to provide a lunch box of the class described above which is inexpensive to manufacture, simple to use and which affords a considerable increase in size while protecting the vacuum bottle against shocks of a nature to cause damage thereto.

Other objects and advantages will become apparent in the following specification when considered in light of the attached drawings, in which:

FIGURE 1 is a perspective view of the invention;

FIGURE 2 is a plan view of the invention with the lunch box shown in open position; and FIGURE 3 is an enlarged vertical sectional view taken along the line 3—3 of FIGURE 1, looking in the direction of the arrows.

Referring now to the drawings in detail wherein like reference characters indicate like parts throughout the several figures, the reference numeral 10 indicates generally a lunch box constructed in accordance with the invention.

The lunch box 10 includes a generally rectangular lower compartment 11 having a generally rectangular bottom wall 12 with a pair of spaced parallel side walls 13, 14 extending integrally upwardly therefrom. A pair of spaced parallel end walls 15, 16 extend integrally upwardly from the bottom wall 12 and connect the side walls 13, 14 at opposite ends thereof.

A cover, generally indicated at 17, includes a pair of spaced apart parallel end walls 18, 19 having a continuous arcuate top wall 20 secured thereto in overlying relation to the bottom wall 12. A lip 21 is integrally formed on the end walls 18, 19 and the arcuate wall 20 along the lower edges thereof to engage over the upper edges of the end walls 15, 16 and the side wall 14. The arcuate top wall 20 along the lower edge thereof opposite the lip 21 is connected by a hinge 22 to the upper edge of the side wall 13 to permit the cover 17 to be hinged from a position overlying the lower container 11, as seen in FIGURE 1, to a position adjacent thereto and on one side thereof, as seen in FIGURE 2. A pair of separable fasteners 23 extend between and releasably connect the cover 17 to the bottom compartment 11 on the side thereof opposite the hinge 22.

The arcuate wall 20 has a flexible handle 24 secured thereto by a pair of cleats 25.

The cover 17 is adapted to have a vacuum bottle 26, shown in broken lines in FIGURE 2, supported therein by a bail, generally indicated at 27. The bail 27 comprises an arcuate V-shaped member 28 having opposed end portions 29 pivotally secured to the forward edge of the arcuate wall 20 by securing elements 30 consisting in rivets which are not shown except for their heads, as in FIG. 1. The bail 27 releasably engages a detent 31 secured to the rear of the arcuate wall 20 intermediate the opposite ends thereof. The bail 27 releasably secures the vacuum bottle 26 within the cover 17.

An arcuate plate 32 extends transversely of the arcuate wall 20 adjacent the end wall 19 and has a depending flange 33 formed on each end thereof which is secured to the arcuate wall 20 adjacent the upper edges of the side walls 13, 14. The plate 32 has a rolled edge 34 formed thereon oppositely of the end wall 19. The bottom of the vacuum bottle 26 is maintained in fixed position in the cover 17 between the plate 32 and the wall 20.

The additional space below the plate 32 can be utilized for extra food items, such as fruit, cup cakes, and the like, while the plate 32 and the additional length of the lower compartment 11, normally restricted to the length of the vacuum bottle 26, permits additional sandwiches and food stuffs to be carried in the lunch box 10 without endangering the vacuum bottle 26 from shocks and breakage.

Having thus described the preferred embodiment of the invention, it should be understood that numerous structural modifications and adaptations may be resorted to without departing from the scope of the appended claim.

What is claimed:

A lunch box comprising a generally rectangular bottom compartment including spaced parallel end walls and spaced parallel side walls connected by a generally rectangular bottom wall, a cover including spaced parallel end walls and an arcuate top wall extending between and connecting said last-named end walls, means hingedly connecting one side of said arcuate wall to the top of one of said side walls, an arcuate plate curving in a direction opposite the curvature of said top wall having a depending flange integrally formed on each end thereof secured to said arcuate wall, said plate being positioned adjacent one of said last-named end walls and of a length substantially less than half the length of said arcuate top wall and spaced from said top wall, adapted to maintain the end of a vacuum bottle loosely adjacent said arcuate top wall to provide additional storage space for small articles around the vacuum bottle, a generally V-shaped bail having its ends offset and hingedly connected to one side of said arcuate wall adapted to secure the vacuum bottle in said cover, a detent on the opposite side of said arcuate wall releasably engaging the apex of said V-shaped bail, and a separable fastener securing the side of said arcuate wall opposite the hinged connecting means to the top of the adjacent side wall.

References Cited in the file of this patent

UNITED STATES PATENTS

| | | |
|---|---|---|
| 1,061,386 | Lamb | May 13, 1913 |
| 1,420,598 | Williamson et al. | June 20, 1923 |
| 1,546,254 | Rotzell | July 14, 1925 |